March 11, 1952  S. J. GARTNER ET AL  2,588,977
INDEXING AND DRIVE MECHANISM
Filed Dec. 19, 1945  4 Sheets-Sheet 1
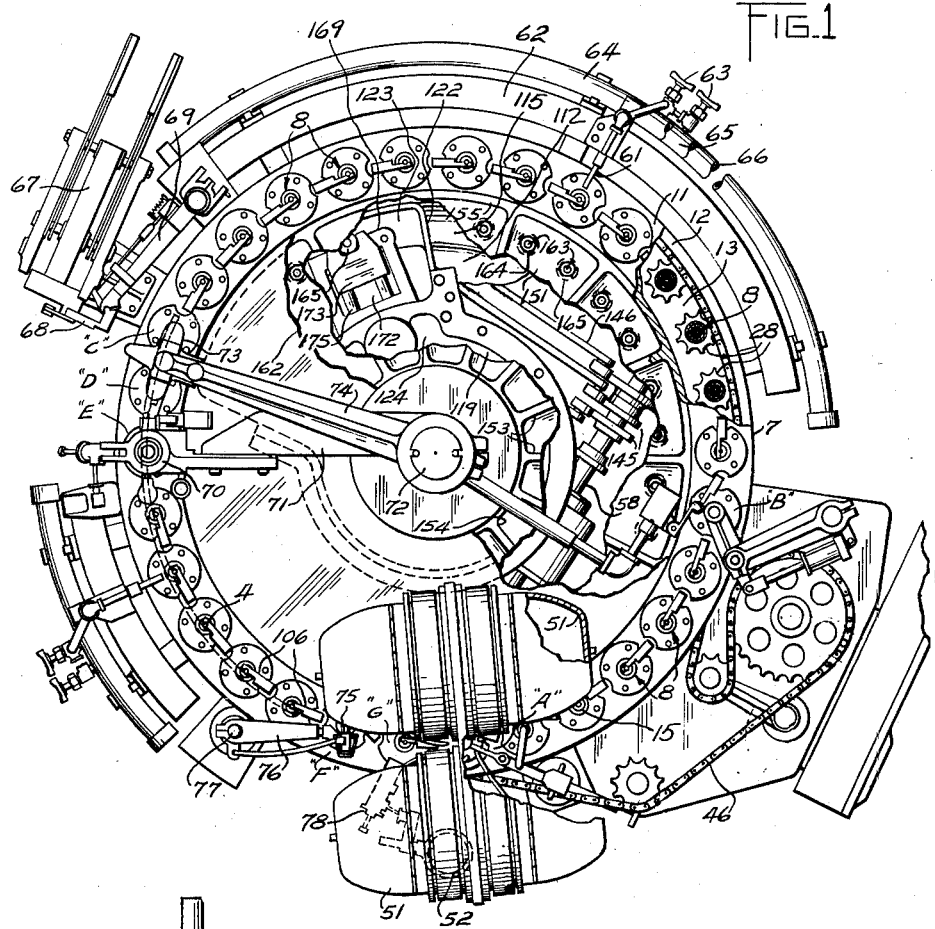
FIG.1
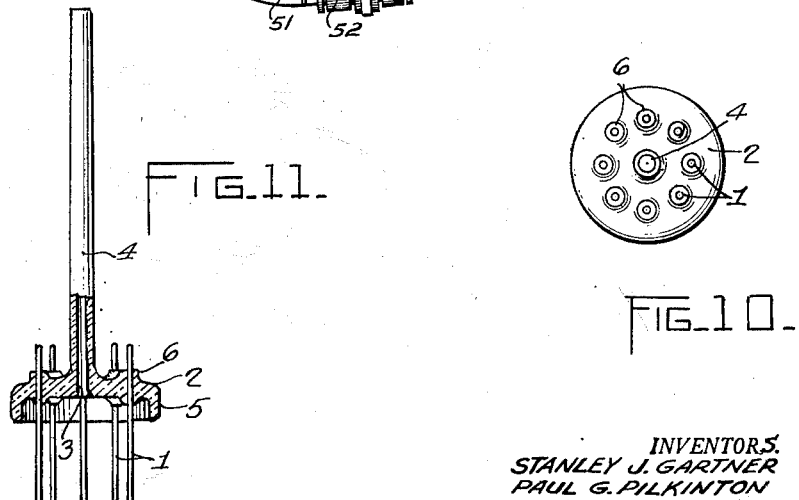
FIG.11.
FIG.10.
INVENTORS.
STANLEY J. GARTNER
PAUL G. PILKINTON
BY
THEIR ATTORNEY

INVENTORS.
STANLEY J. GARTNER
PAUL G. PILKINTON
BY
THEIR ATTORNEY

March 11, 1952     S. J. GARTNER ET AL     2,588,977

INDEXING AND DRIVE MECHANISM

Filed Dec. 19, 1945     4 Sheets-Sheet 3

INVENTORS.
STANLEY J. GARTNER
PAUL G. PILKINTON
BY

THEIR ATTORNEY

March 11, 1952  S. J. GARTNER ET AL  2,588,977
INDEXING AND DRIVE MECHANISM
Filed Dec. 19, 1945  4 Sheets-Sheet 4
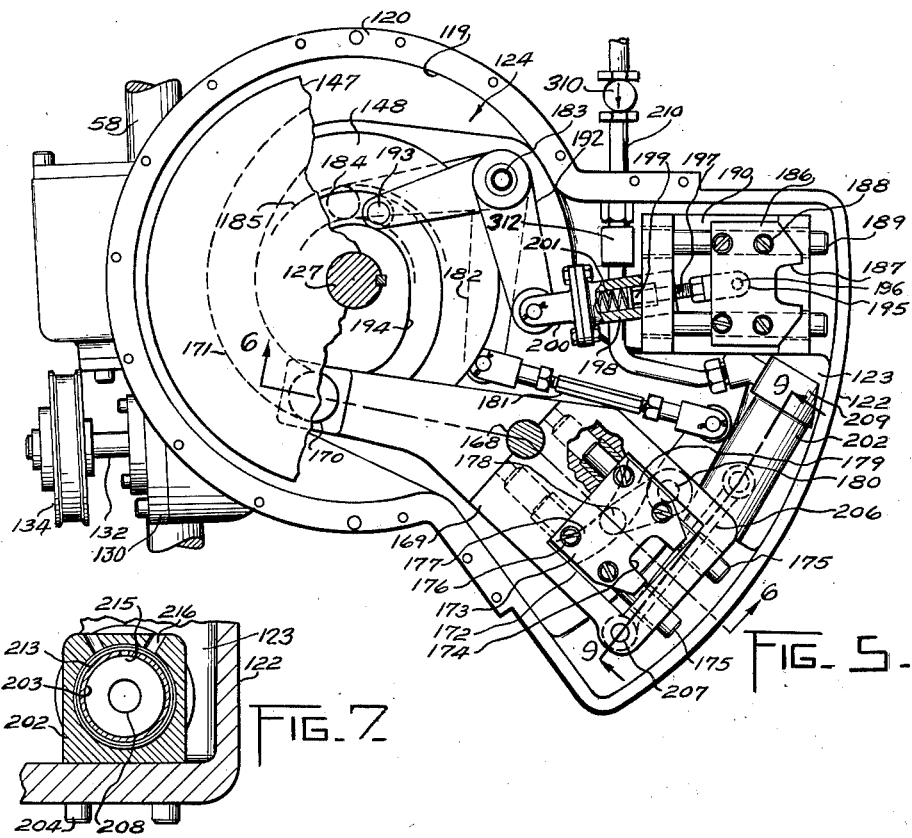
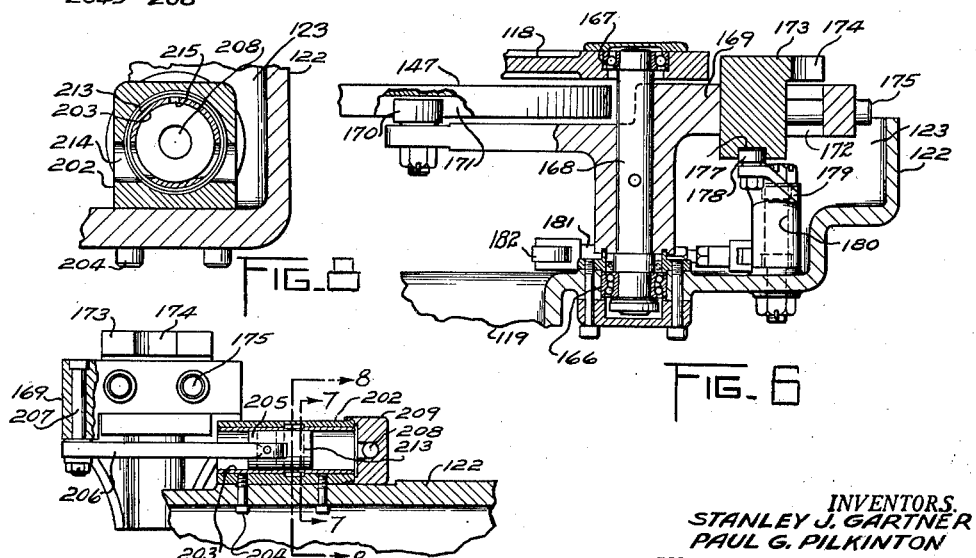
INVENTORS.
STANLEY J. GARTNER
PAUL G. PILKINTON
BY
THEIR ATTORNEY Patented Mar. 11, 1952

2,588,977

UNITED STATES PATENT OFFICE 2,588,977

INDEXING AND DRIVE MECHANISM

Stanley J. Gartner and Paul G. Pilkinton, Emporium, Pa., assignors to Sylvania Electric Products, Inc., a corporation of Massachusetts Application December 19, 1945, Serial No. 635,889

5 Claims. (Cl. 74—112)

This invention relates to a carriage or turret mounted for intermittent angular movement about a vertical axis, and more particularly to a novel indexing and locking mechanism. Although adaptable to general application, the invention, as herein shown and described, is embodied in a machine for use in the radio tube industry and, more particularly, to an automatic machine by means of which terminal pins are sealed into and an exhaust tube fused to the glass header which forms an end closure of a vacuum tube.

A turret for the purpose just above specified because of the several operations to be performed, each at a different station, and the necessity of large capacity for economic production, is required to be of rather large diameter. And, furthermore, although such a carrier is made of the lightest possible metal consistent with strength and rigidity of construction, the many attachments and mountings thereon give it considerable weight.

The turret carries a plurality, thirty in this instance, of regularly spaced, circumferentially arranged spindles each independently rotatable about its own axis. A workpiece comprising a perforated glass wafer or shallow cup is placed on these spindles in any suitable manner as they successively arrive at what may be termed a first or loading station and the finished assembly is automatically removed after all operations have been completed.

During the cycle of intermittent movements automatic operations are performed at predetermined stations by mechanisms timed, of course, with the indexing devices. Also, throughout a considerable portion of the cycle, high heat flames are directed against the work from burners arranged radially and coincident with the radial lines of the turret in which the spindles are located.

In order to obtain the best results the work should be prevented from cooling to a degree that fusing of the glass to metal stops while passing from the flame of one burner to that of the next. Thus the time interval allowed for each intermittent movement of the turret must be short. The accomplishment of this in a simple and effective manner is an object of the present invention.

Another object of the invention is the provision of devices for accomplishing precision in the high speed indexing of a heavy turret, starting and stopping rotation without jar, and locking the turret during each stopping period against the slightest movement for the reasons that perfect mating of parts at the several operating stations must be maintained and to prevent breaking of the work which, it will be understood, is of a fragile nature.

A further object of the invention is to mount the turret upon a housing providing a chamber wherein the indexing mechanism and its operating means are entirely submerged in oil, to provide an hydraulic cushion functioning to absorb the shock as the turret is intermittently brought to a stop, and to make use of oil within the housing chamber as the fluid employed by the hydraulic cushioning means.

To these and other ends the invention consists of certain parts and combinations of parts as will be fully set forth in the following description and particularly defined in the appended claims.

The accompanying drawings, illustrating, as hereinabove stated, the invention as embodied in a machine adapted to be used in the manufacture of radio receiving tubes for the assembly and sealing of an evacuation tube and terminal pins in the press member or header of a tube, are as follows:

Figure 1 is a top plan view of the machine with parts broken away to show details of construction, and showing only such portions of the super structure and parts surrounding the turret as may be necessary to illustrate in a general way the functions performed at successive stations to which the turret is indexed during its cycle.

Fig. 5 is a top plan view of the indexing and locking mechanism drawn to a smaller scale than that of Fig. 4, the indexing cams and arms actuated thereby also being shown.

Fig. 6 is a fragmentary sectional view on line 6—6 of Fig. 5.

Figures 2, 3:
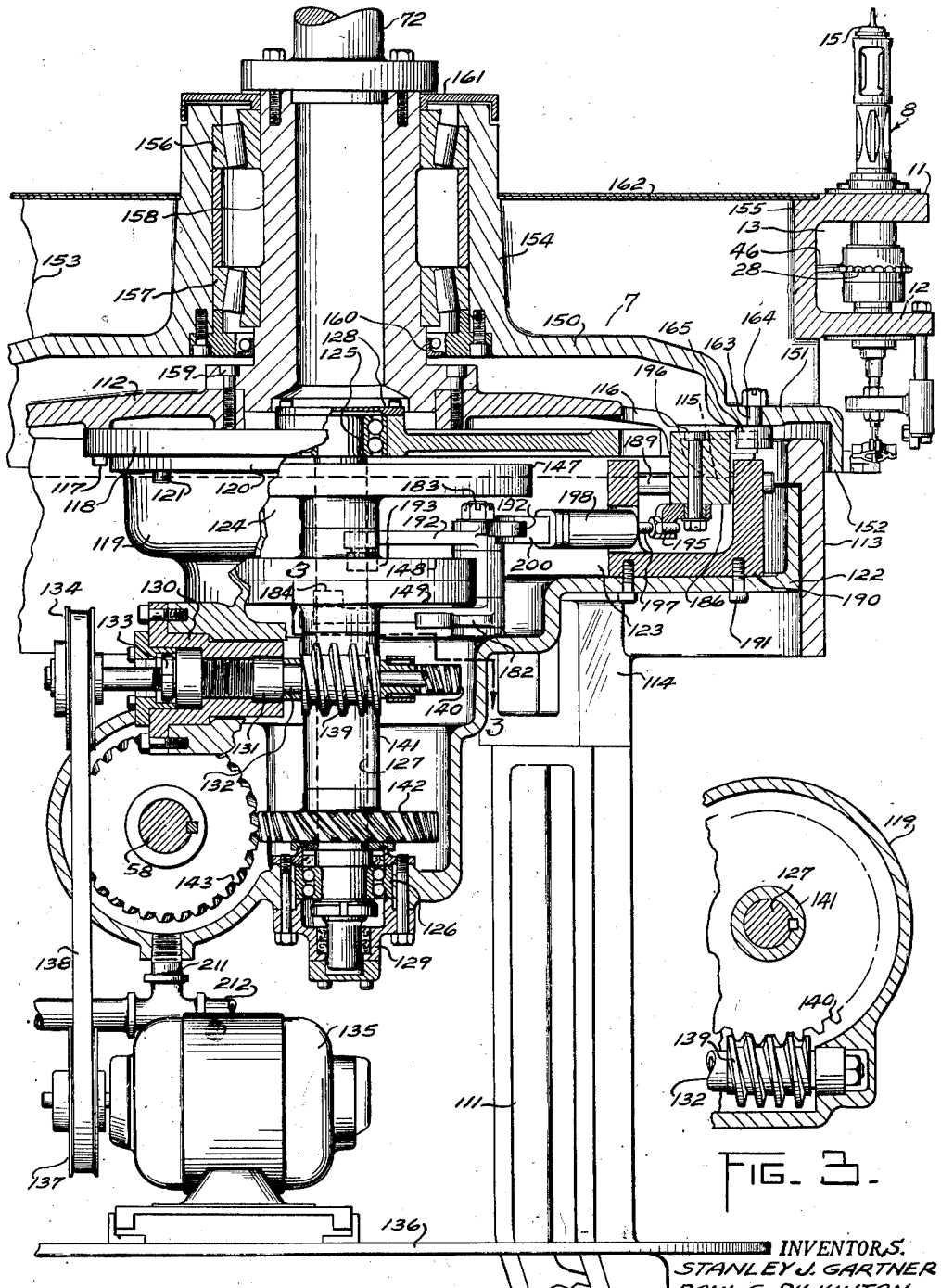
Fig. 2 is a view drawn to a larger scale and showing a portion of the machine partly in side elevation and partly in vertical central section.
Fig. 3 is a sectional detail on line 3—3 of Fig. 2, the gears being shown in full.

Figs. 7 and 8 are parallel sectional details on lines 7—7 and 8—8, respectively, of Fig. 9.

Fig. 9 is a sectional view on line 9—9 of Fig. 5.

Fig. 10 is a top plan view of the completed workpiece.

Fig. 11 shows the workpiece partly in elevation and partly in vertical control section.

In the drawings similar reference numerals refer to similar parts throughout the several views.

The work to be accomplished by the machine is, referring first to Figs. 10 and 11, the assembly and hermetically sealing of a plurality of terminal pins 1 in an inverted cup-shaped glass header which in use forms an end closure for an electronic tube of the type used in radio receiving sets and, further, by fusing of the glass to attach integrally therewith a hollow glass stem upstanding from the header and through which the tube is evacuated, the stem later being sealed close to its inner end and the extra length cut off.

The header referred to is shown as a glass wafer or disc 2 having a central aperture 3 opening into the stem which comprises an elongated tubing 4. In a circle concentric with the opening 3 are a plurality of apertures for receiving the pins 1 while the peripheral edge of the disc is turned down to provide a depending, reinforcing flange 5 which later is joined with a cylindrical glass envelope to form the bottom portion thereof. Protuberances 6 surrounding the pins and formed during a pressing operation give additional support for the pins 1.

We shall now describe out new machine for forming the above described header and particularly to that part of the machine which accomplishes the indexing and the spindle drive.

Regularly spaced angularly in a circle concentric with and adjacent the outer peripheral edge of a rotatable carrier which, in this instance, is a turret 7, are a plurality of spindles indicated generally by the numeral 8. These spindles are each mounted to rotate independently about a vertical axis on bearings located in spaced horizontally extending top and bottom annular flanges 11 and 12, respectively, extending outwardly from the side wall of the turret 7 to form an outwardly opening channel 13.

Each spindle 8 carries at its upper end a lower mold 15 of a pair of press members.

There is shown in plan view, Fig. 1, a plurality of hoppers 51 for separately containing a supply of terminal pins which may be of different lengths, these hoppers are supported upon a standard indicated at 52. A feed tube, not shown, for the pins 1 leads from each hopper and when a spindle 8 is at station "A" mechanism is actuated for suitably feeding a pin 1 into each of the apertures in the mold 15.

From station "A" the particular spindle to which reference is being made is advanced counter-clockwise by a succession of intermittent movements effected by our improved indexing mechanism to station "B." At several of the intervening stops between stations "A" and "B" the spindles 8, while not held against axial rotation, are not being positively driven due to their sprockets 28 being out of mesh with the chain 46. This is the loading zone where the operator by means of a pair of tongs picks up a preheated glass disc 2 from the discharge end of a chute or other source of work supply and places it on the mold 15 and over the pins 1 which are upstanding from the mold.

From station "B" to station "C" the spindles are intermittently advanced and while transversing this zone, and independently rotating about their axes, the work thereon is heated by flames directed at it from burners, one of which is indicated at 61, these burners being supported by a segmental frame member 62 partly surrounding the turret and having control valves 63 whereby a proper admixture of gas, air, and oxygen is furnished through the supply pipes 64, 65, and 66.

At station "C" where rotation of the spindle is not stopped, a stem 4 is placed endwise on the wafer 2 fused to it to form an integral unit, the stem being received from a supply hopper 67 by a carrier 68 which turns it to an upright position whence it is grasped by a spring retractable pivoted arm 69 and swung to alignment with the axis of the spindle.

The second intermittent stop beyond station "C" is at station "E" where the spindle is locked against rotation, and a press, indicated generally by numeral 70, Fig. 1, is carried by a fixed arm 71 extending radially from the center post 72 of the machine. This press includes an upper mold, not shown, which mates with the lower mold 15 to press the softened glass of wafer or header 2, thus molding the glass to form the protuberances 6 and effecting a sealing of glass to metal around the pins 1. At the same time, acting in cooperation with following spindles, a prepress member 73 carried by a fixed radial arm 74 has pressure pads acting against the ends of stems 4 at station "C" and at the intermediate stop "D" between stations "C" and "E." This press and pre-press device forms subject matter of a copending application Serial No. 634,420, filed December 12, 1945, and, for that reason, it is believed a more detailed description thereof in this specification is unnecessary.

From station "E" the work is intermittently advanced to station "F" where the spindle 8 is locked against rotation and gripping fingers 75 clamp the stem 4 of the finished work-piece, lift the work off the mold 15 and, by means of a swinging arm 76 pivoted at 77, deposit it onto a discharge chute, not shown. At the next stop, indicated at "G" and being the one intermediate the unloading station "F" and the starting or pin escapement or feeding station "A," an atomizer 78, Fig. 1, is employed to spray the mold 15 with a solution which prevents adherence of the glass to the mold.

A casting comprising a table is supported upon a plurality of circumferentially arranged legs one only of which is shown at 111 in Fig. 2. This table includes a top 112, a depending peripheral flange 113 providing a skirt, and radial lugs 114 extending inwardly from the flange to rest upon and be secured to the legs 111. The top 112 is formed with an annular channel 115 adjacent its outer periphery, a portion of the top 112 being cut away to provide an opening 116 through which certain parts associated with the turret 7 may engage the indexing mechanism beneath top 112, as will be explained.

Secured to the under side of the table top 112 by screws 117 is a plate 118 comprising a cover for a housing 119 having a flange 120 which by screws 121 is secured to the cover plate 118. The housing 119 is of general cylindrical shape but is progressively reduced from top to bottom to smaller diameters at different levels. The top part of the housing is that of greatest diameter and has a segmental extension 122 in one portion which provides a side pocket or chamber 123 in communication with the housing chamber proper 124, as shown in Figure 5. Hub portions on the cover plate 118 and the bottom wall of the housing are bored to receive axially aligned ball bearings 125 and 126, respectively, in which is journalled a vertically extending shaft 127, the hub on plate 118 being capped by a ring 128 and that on the bottom wall by an oil tight seal indicated generally by the numeral 129. In the side wall of the housing 119 is a bore for receiving a shouldered bushing 130 in which is a bearing sleeve 131 for a horizontally extending shaft 132, the latter extending outwardly from the housing through a packing gland 133 and carrying a pulley 134.

An electric motor 135 is supported upon a shelf 136. Fixed to the motor shaft is a pulley 137 which through the medium of a belt 138 and the pulley 134 drives the shaft, 132. Fixed to the shaft 132 within the housing or gear box 119 is a worm gear 139 which drives a worm wheel 140 keyed to the shaft 127 as illustrated in Figs. 2 and 3. Also keyed to shaft 127 and spaced therefrom by a sleeve 141 is a helical gear 142 which drives a like gear 143 fixed to the shaft 58 also mounted to rotate in sealed bearings in the housing 119. This shaft 58, see Fig. 1, carries a plurality of cams, indicated generally by the numeral 145, which actuate rocker arms 146 operatively connected, but in a manner not shown, to the pin feed and other mechanisms hereinabove referred to as functioning at the several operating stations of the turret. Also keyed to shaft 127 intermediate the top bearing 125 and worm wheel 140 are three plate cams 147, 148, and 149 which control the indexing mechanism now to be described.

The spindle carrier or turret 7 is a rigidly constructed casting having besides the spaced annular flanges 11 and 12 which support the spindles 8, a bottom wall 150 stepped down to form a flat annular portion 151 adjacent its outer periphery which latter terminates in a depending flange 152 encircling the skirt portion 120 of the housing 119. And, upstanding from the bottom wall portions 150 and 151 are a plurality of regularly spaced radial ribs 153 extending from a hub 154 to an annular, outer vertical wall 155 which connects the horizontal flanges 11 and 12. The turret is rotatably supported by axially spaced tapered roller bearings 156 and 157 on a tubular bearing member 158 seated in the top wall 112 of the table in axial alignment with shaft 127 and having a flange which by screws 159 is secured to such table top. At the lower end of the hub 154 is an oil seal 160 while its outer end is capped by a ring 161. A sheet metal plate 162 covers the openings in the turret between the ribs 153 and secured to the upper end of the fixed bearing member 158 is the flanged lower end of the center post 72 which carries the press arm 71 Fig. 1.

Extending vertically through the flat portion 151 of the turret 7 are a plurality of regularly spaced, circumferentally arranged studs 163, there being one for each spindle 8. Each stud is held in place by a nut 164 threaded on its outer end and on its inner end carries a hardened steel roller 165. These rollers, as the turret revolves, travel in the channel 115 in the upper surface of top 112. They extend down through opening 116 in top 112 whereby the rollers may engage operating elements of the indexing mechanism.

Mounted to rotate in ball bearings 166 and 167 seated in the housing 119 and its cover plate 118, respectively, as illustrated in Fig. 6, is a short shaft 168 to which is pinned the hub portion of a lever 169 which, in this instance, is angular in longitudinal extent and moves in a horizontal plane. This fulcrum 168 of the lever is approximately equidistant from the ends thereof and is in a radial line of the turret midway between the centers of two adjacent rollers 165. The inner end of the lever carries a roller 170 which follows the cam slot 171 in the underface of cam 147 and the throw of the lever is the included angle between radii passing through two adjacent rollers 165 and whose axis is the fulcrum point 168.

Through the outer arm of the lever 169 is a rectangular opening 172 for receiving a slide or carriage block 173 having an outwardly opening slot 174 to provide a forked end on the block which successively engages the rollers 165. The block 173 is adjustably secured upon a pair of parallel rods 175 by set screws 176 Fig. 5, the rods spanning the opening 172 and being slidable in bushed openings in opposing walls thereof.

Figure 4:
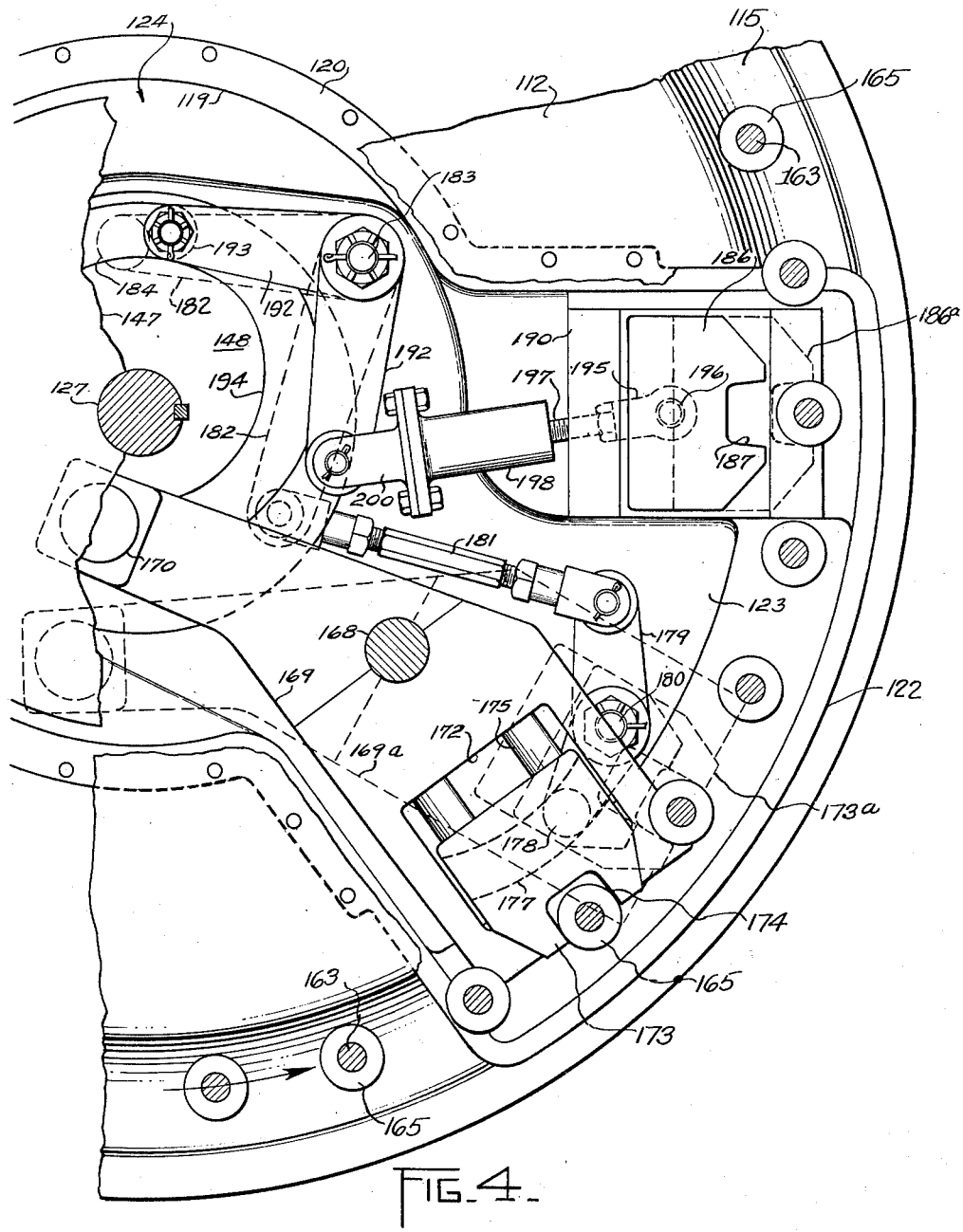
Fig. 4 is a still more greatly enlarged fragmentary plan view showing graphically the indexing and locking mechanism in one position in full lines and in dotted lines in another position.

In the bottom face of carriage block 173 is a cam slot 177 concentric with shaft 168 for receiving the follower 178 on one arm of a two-armed lever 179 pivoted on a stud 180 upstanding from the housing part 122, as shown in Figs. 4, 5 and 6. The other arm of lever 179 through an adjustable link 181 is connected to one arm of a bellcrank lever 182 pivoted on a stud 183 upstanding from the housing 119, the other arm of this lever carrying a follower 184 which engages the side walls of a cam slot 185 cut in the under face of cam 149.

The indexing slide 173 and that portion of the lever 169 upon which it is mounted operate within the side pocket 123 of the housing and also within this lateral pocket is a generally similar slide 186 for locking the turret against rotation, this slide also being slotted at 187 to provide a bifurcated end for engaging the rollers 165 and, by set screws 188, being adjustably secured upon parallel rods 189 slidable in opposing side walls of a U-shaped bracket 190 secured by screws 191 to the bottom wall of the housing part 122. This locking slide is moved radially in and out by means of a link connection with one arm of a second bellcrank lever 192 also pivoted on the stud 183 with the other arm of such lever carrying a follower 193 which engages the side walls of a cam slot 194 in the upper face of cam 148. The link connection just above referred to includes a clevis 195 pivoted to the slide at 196, a rod 197 adjustably threaded into the clevis, a cylindrical member 198 having an end wall the inner face of which is normally engaged by a head 199 on said rod, a connnector 200 pivoted to the first named arm of the bellcrank and having a flanged coupling with the other end of the cylindrical section, and a coiled compression spring 201 within the latter interposed between the head 199 and the connector 200. Thus there is provvided a positive connection between the cam actuated lever and the slide 186 for moving the latter out of engagement with a roller 165 and a flexible connection when moving the slide outwardly to straddle a roller so that the locking means moves into operative position with a cushioning effect and with the assurance of perfect engagement.

Operation of the indexing mechanism as so far described is as follows:

Assuming that the turret is locked and about to be indexed to the next position, members 173 and 186, will be in the respective positions illustrated in Fig. 5. Then, with shaft 127 turning counterclockwise, rotation of cam 149 will, through its consequent actuation of lever 182, link 181, and lever 179, cause outward movement of the sliding block 173 into engagement with a roller 165 as shown in full lines in Fig. 4, it being understood that in this movement the longitudinal center line through the block lies coincident with a radial line passing through the axis of the roller to be engaged and the fulcrum 168 of lever 169. After this operation rotation of cam 148 effects actuation of lever 192 which, through its link connection with sliding block 186, causes movement of the latter from operative to inoperative position, that is, from the locking position in which it is shown in dotted lines at 186ª in Fig. 4 and in full lines in Fig. 5, to the position shown in full lines in Fig. 4. During engagement of one sliding member and disengagement of the other with respective rollers 165, the turret has, it will be observed, by one such member or the other, been securely locked against rotary displacement but is at this time ready for the indexing movement.

This indexing is effected by a throw of the lever 169 by means of the cam 147 from the full line position, in which it is shown in Fig. 4, to the dotted line position indicated at 169ª in Fig. 4, the sliding member 173, being in engagement with a roller 165 and carried by the lever 169, becoming the direct connection for rotating the turret through an angular movement equal to that between radial lines of the turret passing through the axial centers of two adjacent rollers 165. At the completion of each such indexing of the turret, the slide 186 is moved radially outward to its dotted line position 186ª Fig. 4, but in locking engagement with the next roller 165 following the one from which it was previously disengaged. And whereupon the indexing slide 173, by action of its operating cam 149 is disengaged from its roller 165 and retracted radially of lever 169 from its dotted line position at 173ª, Fig. 4, to the full line position shown in Fig. 5. Thus the indexing and locking devices are in position to repeat the operations for the next indexing of the turret. Movement of slide 186 into locking engagement with a roller 165 is cushioned by action of the spring 201 within the tubular housing 198 of its link connection with lever 192, the spring thus sustaining any jar and assuring perfect contact of the roller with the bottom of the slot 187. And, by having follower 178, which is the pivotal connection between lever 179 and the indexing carriage member 173, movable in the curved channel 177, proper articulation of the swinging arm 169 and the linkage comprising levers 179, link 181, and lever 182 is maintained.

As hereinbefore mentioned, the indexing mechanism and operating means therefor are submerged in oil. This oil substantially fills the chamber 124 of housing 120, its side pocket 123 and, through the opening 116, fills the channel 115 sufficiently to lubricate the rollers 165.

Although the indexing mechanism operates in a manner to smoothly effect the rapid intermittent movements of a heavy turret, we have provided an hydraulic cushioning means for allowing the turret to come to an easy stop without jarring or backlash. To this end an oil cylinder comprising an outer casing 202 and a fixed inner sleeve 203 is secured by screws 204, as illustrated in Figs. 5, 7, 8 and 9 to the housing 119 within the side pocket 123. A piston 205, slidable in the sleeve 203, is reciprocated by a rod 206 pivoted at one end thereto and at its other end to a pin 207 carried by the lever 169. The oil intake to the cylinder in rear of the plunger is through port 208 in the cylinder head 209 which communicates with a supply pipe 210 the latter including check valve 310 and pressure regulator 312, receiving oil from the bottom of the chamber 124 through the lateral 211 (Figure 2) which in turn connects also with the main oil supply line 212. An inwardly opening, comparatively wide annular groove in the casing 202 and a like opposing groove in the sleeve 203 provides an annular channel 213 within the cylinder wall. Communicating with this channel are opposing lateral openings 214 extending through both the sleeve and the cylinder casing. And, beyond the openings 214 toward the head end of the cylinder, but within the area of the channel 213 is a smaller aperture 215 through the sleeve communicating with the channel and thence through slightly larger ducts 216 in the casing wall to the chamber 124.

Thus, movement of the lever 169 to index the turret causes an inward movement of the piston 205, an opposing pressure on the piston being established due to oil being prevented from being forced backward through pipe 210 into chamber 124 by the check valve 310 therein. The initial pressure is reduced however because of oil escaping from the cylinder through the ports 214. Then the pressure builds up as these ports are closed by the piston and the escaping oil is forced through the smaller orifice 215, channel 213 and ducts 216, the maximum pressure being established after the aperture 215 has been closed and the piston nears the completion of its stroke which ends when the indexing movement is completed, this final pressure being determined by adjustment of the pressure regulator 312 which relieves excess pressure through a side vent into housing 124.

From the foregoing it will be observed that this invention provides means for effecting rapidly, precisely and without jar the indexing of a rotatably mounted heavy turret and a positive locking of the turret while at rest.

Although we have shown and described particular embodiments of our invention, we do not desire to be limited to the embodiments described, and we intend in the appended claims to cover all modifications which do not depart from the spirit and scope of our invention.

What we claim is:

1. The combination, with a rotatably mounted turret including a wall portion and a plurality of projections from said wall portion regularly spaced in a circle concentric with the axis of the turret, of an indexing and locking mechanism for said turret comprising two sliding members, means providing a support along which one of said sliding members is guided for reciprocating movement into and out of locking engagement with one of said projections, a lever, means providing a pivot for said lever for movement in a plane parallel to that of the turret, guiding means carried by said lever and rigidly mounted thereon along which the other of said sliding members is guided for reciprocatory movement along said lever into and out of locking engagement with another of said projections, means for effecting a throw of said lever in one direction to index the turret a distance equal to the angular spacing between two adjacent ones of said projections when the said slide thereon is in locking position and for moving said lever in the opposite direction when the said slide is in unlocked position, and means for effecting reciprocation of each of said sliding members independently of the throw of said lever.

2. The combination with a support and a turret mounted upon said support to rotate about a vertical axis, a plurality of vertically extending cylindrical projections carried by said turret and regularly spaced angularly in a circle concentric with said axis, a shaft coaxial with the turret, means for driving said shaft and three cams fixed to and axially spaced on said shaft, of indexing and locking mechanism for said turret including an indexing lever fulcrumed intermediate its ends to said support for oscillating movement, said fulcrum being in a radial line of said turret midway between two adjacent ones of said projections, a follower on one arm of said lever in operative engagement with one of said cams, the other arm of said lever having an opening therethrough, a frame part on said support, two carriage members mounted for reciprocating movement each such member including a slide and a carriage block longitudinally adjustable on its respective slide and formed with an open ended slot for slidably receiving individually successive ones of said cylindrical projections on outward movement of the carriage into locking engagement therewith, one of said carriage slides being guided in said frame part radially of said turret, and the other in opposing walls of the opening in said indexing lever, the last named carriage being a releasable connecting medium between said indexing lever and the turret and having a cam slot concentric with the fulcrum of said indexing lever, means for actuating said last named carriage comprising a first bellcrank lever pivoted to said support and having a follower on one arm thereof in operative engagement with another of said cams, a lever pivoted intermediate its ends to said support and having a follower on one arm engaging the walls of said carriage slot, and an adjustable link connecting the other arm of said last named lever and said bellcrank, and means for reciprocating said radially movable carriage comprising a second bellcrank lever pivoted to said support, a follower on one arm of said lever in operative engagement with the third one of said cams, and an adjustable connection between the other arm of said lever and said radially movable carriage, the two said carriages moving alternately into locking engagement with respective ones of said projections one to index said turret and the other to lock the turret against rotary movement.

3. A turret mounted to rotate about a vertical axis, a hollow housing beneath said turret containing mechanism for indexing said turret about in a number of regular steps, said mechanism including a lever pivoted to swing about a vertical axis and carrying means for releasably engaging said turret to effect its movement, a fluid cylinder mounted within said housing and having a number of fluid escape openings along its length, and a piston within said cylinder connected to said lever, said cylinder being covered by lubricating liquid within said housing.

4. A turret mounted to rotate about a vertical axis, a hollow housing beneath said turret containing mechanism for indexing said turret about in a number of regular steps, said mechanism including a lever pivoted to swing about a vertical axis and carrying means for releasably engaging said turret to effect its movement, a fluid cylinder mounted within said housing and having a number of fluid escape openings along its length, a piston within said cylinder connected to said lever, said cylinder being covered by lubricating liquid within said housing, at least one of said openings being connected to a check valve and a pressure regulator whereby the braking effect, on said lever, of the movement of said piston within said cylinder in one direction may be controlled relative to the movement in the other direction.

5. A turret mounted to rotate about a vertical axis, a hollow housing beneath said turret containing mechanism for indexing said turret about in a number of regular steps, said mechanism including a lever pivoted to swing about a vertical axis and carrying means for releasably engaging said turret to effect its movement, a fluid cylinder mounted within said housing and having a number of fluid escape openings along its length, a piston within said cylinder connected to said lever, said cylinder being covered by lubricating liquid within said housing, an opening at the end of said cylinder being connected to a check valve and a pressure regulator whereby the braking effect, on said lever, of the movement of said piston within said cylinder in one direction may be controlled relative to the movement in the other direction.

STANLEY J. GARTNER.
PAUL G. PILKINTON.

REFERENCES CITED

The following references are of record in the file of this patent:

UNITED STATES PATENTS

| Number | Name | Date |
|---|---|---|
| 290,066 | Kimble | Dec. 11, 1883 |
| 646,287 | Hundhausen | Mar. 27, 1900 |
| 986,378 | Furlow | Mar. 7, 1911 |
| 1,199,398 | Loftus | Sept. 26, 1916 |
| 1,896,732 | Stone | Feb. 7, 1933 |
| 2,291,382 | Duglin | July 28, 1942 |
| 2,376,540 | Iden | May 22, 1945 |
| 2,393,294 | Crane | Jan. 22, 1946 |
| 2,413,960 | Eeisler | Jan. 7, 1947 |
| 2,421,327 | Hallowell, Jr. | May 27, 1947 |
| 2,421,929 | Eeisler | June 10, 1947 |